United States Patent [19]

Giannakopoulos

[11] Patent Number: 4,884,526
[45] Date of Patent: Dec. 5, 1989

[54] DISPOSABLE KITTY LITTER BOX AND BAG COMBINATION

[76] Inventor: Cidell M. Giannakopoulos, 19 Abbeywood, Romeoville, Ill. 60441

[21] Appl. No.: 116,829
[22] Filed: Nov. 5, 1987
[51] Int. Cl.⁴ ............................................. A01K 29/00
[52] U.S. Cl. ........................................................ 119/1
[58] Field of Search ............................................. 119/1
[56] References Cited

U.S. PATENT DOCUMENTS

| Re. 30,424 | 11/1980 | Heldenbrand | 119/1 |
| 3,227,137 | 1/1966 | Goldman et al. | 119/1 |
| 4,457,261 | 4/1984 | Marshall | 119/1 |
| 4,541,360 | 9/1985 | Higgins et al. | 119/1 |
| 4,646,685 | 3/1987 | Arenz | 119/1 |

Primary Examiner—Robert Peshock
Assistant Examiner—Adriene J. Lepiane
Attorney, Agent, or Firm—Ernest Kettelson

[57] ABSTRACT

A disposable kitty litter box and bag assembly in which the box with litter is inside the bag. The bag wall is long enough be gathered together at the top and tied shut with the box and used kitty litter closed inside. The entire assembly is then disposed of together as a unit. The part of the bag wall which extends upwardly beyond the wall of the box inside is doubled back in folds and held in place by a band or other releasable retaining device until the litter has been used and the entire assembly is ready for disposal. At such time, the band is removed or separated to allow the folds of the bag wall to be unfolded and lifted above the box and litter for closing and tying shut.

20 Claims, 3 Drawing Sheets

DISPOSABLE KITTY LITTER BOX AND BAG COMBINATION

BACKGROUND OF THE INVENTION

This invention relates to the field of sanitary receptacles for pets such as cats which contain an absorbent material referred to as litter, and particularly to those receptacles which themselves are disposable when the litter is ready to be disposed of.

Prior art devices in this field have been inconvenient to use, usually requiring some assembly by the purchaser, and usually requiring the purchaser to then obtain and pour the litter material in the box after it has been assembled. Examples of such prior art devices include those disclosed in the following U.S. patents.

U.S. Pat. No. 4,646,685 discloses a unit which requires assembling a box out of a flat sheet of box-forming material. Even though when assembled the corners of the box overlap, it appears that cracks and openings will still exist through which liquids can seep. In the present invention, the box is made by the manufacturer with side walls having intergrally joined corners, or otherwise made so as to eliminate openings and cracks through which liquids can seep. No assembly of the box is needed by the purchaser of the kitty litter box and bag combination in accordance with the present invention.

U.S. Pat. No. 4,541,360 discloses a disposable animal litter box but without any bag of liquid impermeable material in which to enclose the box when ready for disposal. A previous torn away perforated strip is all that is used to cover the used litter, merely replacing it in the opening of the box from which it was originally torn away.

U.S. Pat. No. 4,305,544 discloses a flat sheet of material such as cardboard with score lines, tabs and slots whereby a cat litter box can be assembled for use and eventually discarded.

U.S. Pat. No. 4,271,787 discloses a plurality of litter boxes housed in stacked relationship within a separate box which the purchaser has to assemble. When the litter in the top one of the stacked boxes has been used and ready to dispose of, that one is thrown out and the cover on the box below is torn off to expose the litter therein for use. A separate carrying case is provided for the entire assembly.

U.S. Pat. No. 3,886,901 discloses an originally sealed box having a separate bag of cat litter therein, the sides of the original box being foldable outwardly when the tearstrip is torn away thereby providing the box in which the litter is poured for use by the cats.

U.S. Pat. No. 3,684,155 discloses a book-fold type of receptacle and a flexible sheet line is placed within this receptacle with portions of the edges of the flexible sheet liner gripped in serrated slots formed in the side walls of the receptacle. When a flexible sheet bag or liner is placed within the litter box, it quickly becomes torn from the cats' scratching. The present invention places a flexible sheet disposal bag outside of the litter box, where it cannot be scratched by the cats and torn, and where it serves as an extra measure of protection to retain any liquids that may eventually soak through a cardboard box or any other material that is inexpensive enough to be used for a disposable litter box. The band surrounding the folds of the bag holding them against the side walls of the box in accordance with the present invention, makes the bag itself into an outer protective wall receptacle which can contain not only liquid that may soak through the box material but any which may leak out in the event a break should occur in the bottom or side walls of the carboard box. In other words, the bag provides an extra layer of protection against leads when used outside of the box with its folded peripheral wall extending upwardly the length of the side walls of the box and held there by a surrounding belt or band.

U.S. Pat. No. 3,227,137 discloses a flexible sheet bag of thermoplastic material such as polyethylene placed within a cat litter box. As pointed out above, such material is readily torn by cats using the box and then scratching the bottom. The present invention solves that problem by providing a flexible sheet disposal bag outside of the litter box, and then supporting its folded peripheral wall along the peripheral side walls of the box by a band or belt to serve as a second layer of protection against leaks which is particularly important to have for a disposable unit made of throw away materials. The litter box itself in U.S. Pat. No. 3,227,137 is not disposable but described as re-usable with a new bag or liner after the previous one has been thrown away. Therefore, the problem still remains of having to clean the litter box itself each time the plastic bag is torn by cats' scratching allowing liquids and the litter itself to break through into the box.

SUMMARY OF THE INVENTION

It is an object of the invention to provide a disposable kitty litter box and bag combination which does not require any assembly by the purchaser to use.

It is an object of the invention to provide a disposable kitty litter box and bag combination in which the bag encloses the litter box and is protected from being torn by cats scratching in the litter box.

It is an object of the invention to provide a disposable kitty litter box and bag combination in which the bag forms a second leak proof peripheral wall outside of and surrounding the peripheral side walls and bottom wall of the litter box.

It is an object of the invention to provide a disposable kitty litter box and bag combination in which both the litter box and bag are made of inexpensive disposable materials whereby both may be disposed of together as a unit.

It is an object of the invention to provide a disposable kitty litter box and bag combination in which the litter box is inside of the bag, and the peripheral wall of the bag is folded against the peripheral side walls of the litter box and held there-against until the unit is ready for disposal whereupon the peripheral wall of the bag is unfolded, drawn upwardly and tied to completely enclose the litter box and contents for disposal.

It is an object of the invention to provide a disposable kitty litter box and bag combination in which kitty litter is already included at the time of purchase.

It is an object of the invention to provide a disposable kitty litter box and bag combination in which the box is fully assembled prior to purchase with all corners and seams integrally formed or otherwise sealed against leaks and with no openings or cracks at any place in the peripheral side walls and bottom wall of the litter box.

It is an object of the invention to provide a disposable kitty litter box and bag combination in which the litter box is made of cardboard or other inexpensive material which is permeable resistant to liquids and the bag is made of polyethylene or other flexible sheet material which is impermeable to liquids, both together provid-

DESCRIPTION OF PREFERRED EMBODIMENT

Figure 1:
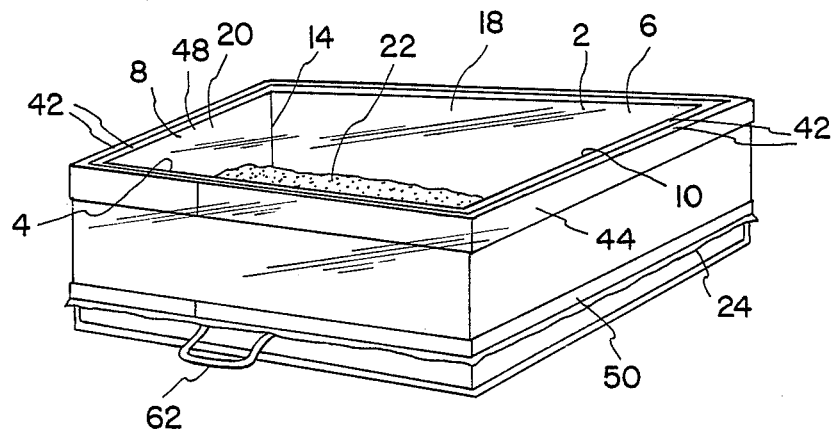
FIG. 1 is a perspective view of a disposable kitty litter box and bag combination in accordance with this invention with the peripheral wall of the bag folded against the peripheral side walls of the litter box.
Figure 2:
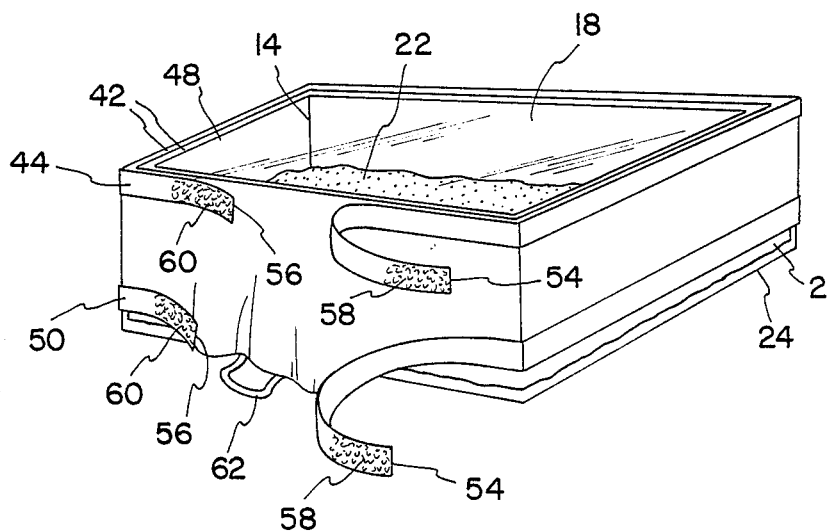
FIG. 2 is a perspective view of the disposable kitty litter box and bag combination of FIG. 1, shown with the retaining bands separated prior to raising the wall of the bag to enclose the litter box for disposal.
Figure 4:
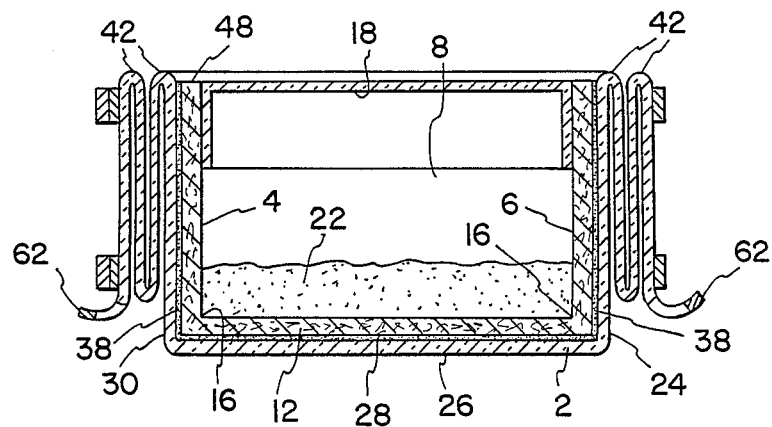
FIG. 4 is a section view taken on line 4—4 of FIG. 3.
Figure 3:
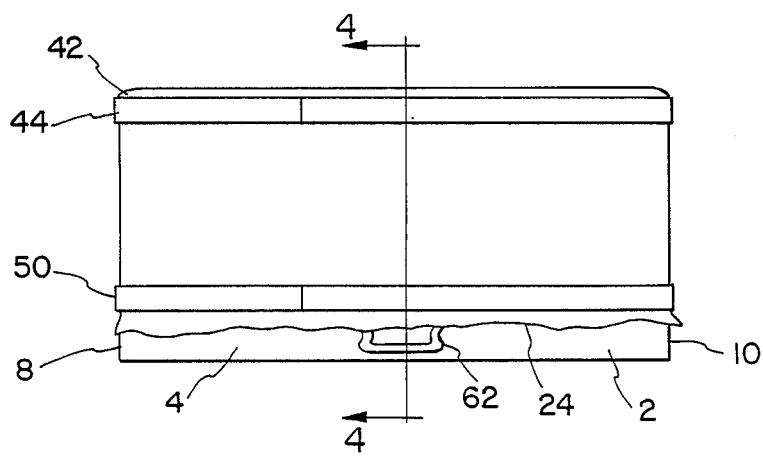
FIG. 3 is a side elevation view of the disposable kitty litter box and bag combination of FIG. 1.

A kitty litter box and bag combination in accordance with this invention includes a litter box 2 having a pair of said walls 4 and 6, a pair of end walls 8 and 10, and a bottom wall 12. The litter box 2 is made of cardboard or other inexpensive material which s permeable resistant to liquids. The litter box material in other words is substantially leak proof. The adjoining side wall corners 14 of the litter box 2 are integrally formed with the adjoining walls, or are otherwise sealed against any cracks or openings. The adjoining side wall to bottom wall corners 16 of the litter box 2 are also integrally formed or otherwise sealed against any cracks or openings. The entire peripheral side wall and bottom wall area of the litter box 2 is imperforate, without any cracks or openings in or through the side walls or bottom wall.

A sheet of clear plastic material 18 such as polyethylene is provided across the open top wall 20, bonded to the side walls 4 and 6 and end walls 8 and 10, to retain a quantity of litter material 22 in the litter box 2. The litter material 22 is placed in the box 2 by the manufacturer who then bonds the clear plastic sheet 18 to the side and end walls to cover the open top wall 20 until the unit is sold and delivered to the customer. The clear plastic sheet 18 is then torn away by the customer when the litter box is to be placed in use.

The litter box 2 is placed in the bag 24 of flexible sheet material such as polyethylene or the like which is ipermeable to liquids, and the bottom wall 12 of litter box 2 is bonded to the bottom 26 of bag 24 by an adhesive layer 28. The peripheral wall 30 of the bag 24 extends upwardly farther than the side and end walls of the litter box 2 a sufficient distance to enable gathering the upper edge 32 of the peripheral wall 30 together and tying the bag closed by a tie band 34 thereby enclosing the litter box 2 inside of the bag when ready for disposal.

The lower portion 36 of peripheral wall 30 of the bag 24 may also be bonded to the adjacent side walls 4 and 6, and end walls 8 and 10 of the litter box 2 by a layer of adhesive 38. The liquid impermeable wall 30 of the bag 24 thereby provides an extra layer of protection around the sides and bottom of the litter box 2 against escape of any liquid or other material from the litter box 2.

The upper portion 40 of peipheral wall 30 of the bag 24 is originally folded in folds 42 of appropriate length to lay along the side walls 4 and 6 and end walls 8 and 10 of the litter box 2, where they are held in place by a retaining band 44 around the outer periphery at the upper edge 48 of the litter box 2. A second retaining band 50 may be provided around the outer periphery at the lower edge 52 of the litter box 2. The retaining bands 44 and 50 are relatively narrow strips of fabric or similar material having fasteners to fasten and unfasten their opposite free ends 54 and 56. In the embodiment shown in FIGS. 1–4 of the drawing, the fasteners comprise a strip of small flexible hooks 58 on the inner surface of free end 54 and small flexible loops 60 on the outer surface of free end 56 of each retaining band 44 and 50, comparable to those commonly known and sold under the trademark VELCRO.

When the litter box 2 has been fully used and is ready for disposal, the retaining bands 44 and 50 are unfastened to free the folds 42 of the bag wall 30. A pair of handles 62 are provided at the edge 32 of the bag 30 for a person to grasp and lift upwardly thereby unfolding the bag wall 30 to raise it to its full height above the litter box 2. The bag is then tied shut, and the entire litter box and bag combination with the used litter material inside is taken out for disposal.

Figure 5:
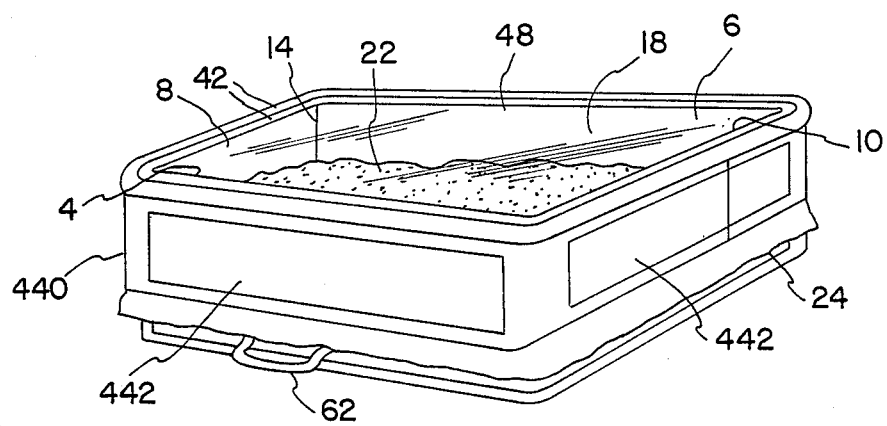
FIG. 5 is a perspective view of a modified form of the disposable kitty litter box and bag in accordance with this invention wherein a wide paper band, which is part of the original packaging, is used to bind the folds of the bag wall against the peripheral side walls of the litter box.
Figure 6:
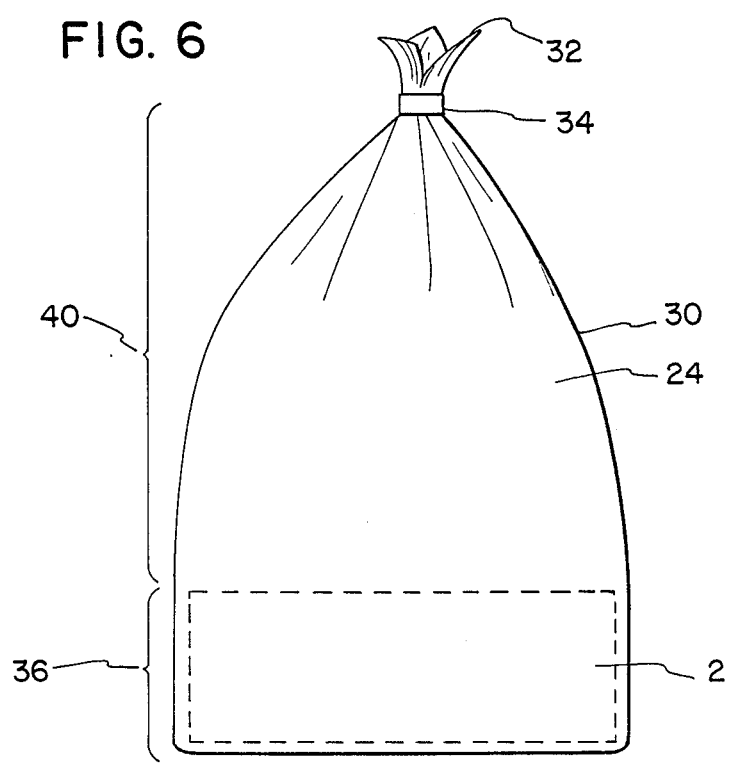
FIG. 6 is a side elevation view of the bag unfolded and tied at the top with the litter box inside ready for disposal of the unit.

A different retaining band 440 is used in the modification of this invention shown in FIG. 5. The modified retaining band 440 is a wide strip of heavy duty wrapping paper used by the manufacturer as original packaging for the unit as it is to be offered for sale. This wrapping paper retaining band 440 includes panels 442 for the manufacturer's trademark and any advertising or promotional material the manufacturer may wish to use to describe and promote the product. This wrapping paper retaining band 440 is of strong enough paper material to hold the folds of the bag wall in place alongside the side and end walls of the litter box until the unit is ready for disposal. At such time the wrapping paper retaining band 440 is torn or cut away, freeing the folds of the bag wall for lifting up to its full extent, tying the top with the litter box and contents inside, and taking the entire unit out for disposal.

I claim:

1. A disposable litter assembly comprising a first receptacle having a substantially leak proof peripheral wall, including a bottom peripheral wall portion and an upwardly extending peripheral wall portion extending upwardly from said bottom peripheral wall portion a first dimension, a second receptacle having a substantially leak proof peripheral wall, said first receptacle being within said second receptacle, said first receptacle having a cavity therein to receive a quantity of litter, said peripheral wall of said second receptacle having a lower peripheral portion thereof adjacent, co-extensive with and facing said upwardly extending peripheral wall portion and said bottom peripheral wall portion of said first receptacle to provide two substantially leak proof walls surrounding said cavity of said first receptacle for double protection against leaks from said cavity, said lower peripheral portion of said peripheral wall of said second receptacle extending across and outwardly of said bottom peripheral wall portion of said first receptacle and upwardly alongside said upwardly extending peripheral wall portion of said peripheral wall of said first receptacle a distance equal to said first dimension and supported thereagainst to provide the second one of said two substantially leak proof walls surrounding said cavity of said first receptacle, said peripheral wall of said second receptacle having an upper peripheral portion thereof extending upwardly from said lower peripheral portion thereof a distance at least as great as said first dimension, said upper peripheral portion doubled back against and facing said lower peripheral portion, and releasable retaining means positioned entirely outwardly of said cavity and of said first receptacle to releasably retain said doubled back upper peripheral portion in facing relationship against said lower peripheral portion of said peripheral wall of said second receptacle until the useful life of said litter assembly has been completed and both of said first and second receptacles are to be disposed of, said upper peripheral portion of said peripheral wall of said second receptacle when released after said useful life of said litter assembly has been completed being extendable upwardly from said peripheral wall of said first receptacle a sufficient distance to close said second receptacle with said first receptacle and said cavity closed therein, including hold together means to hold at least a portion of said first receptacle and said second receptacle together for disposal of both together and to deter disposal of one without the other.

2. A disposable litter assembly as set forth in claim 1, wherein said first receptacle comprises a box, said peripheral wall of said box includes a bottom box wall, a peripheral box side wall extending upwardly from said bottom box wall a first upwardly extending dimension, said peripheral box side wall being continuous, imperforate and unbroken throughout, said peripheral box side wall being joined to said bottom box wall along a continuous, imperforate and unbroken line.

3. A disposable litter assembly as set forth in claim 1, wherein said first receptacle comprises a box, said peripheral wall of said first receptacle includes a bottom box wall, a peripheral box side wall extending upwardly from said bottom box wall said first upwardly extending dimension, said second receptacle comprises a bag, said peripheral wall of said second receptacle comprising a continuous peripheral bag wall of flexible sheet material surrounding a second receptacle cavity and terminating at an upper edge surrounding an opening to said second receptacle cavity, said peripheral bag wall of flexible sheet material being extendable upwardly a second upwardly extending dimension, said second upwardly extending dimension being sufficiently greater than said first upwardly extending dimension to completely enclose said box within said bag.

4. A disposable litter assembly as set forth in claim 3, wherein said doubled back upper peripheral portion of said peripheral bag wall of said second receptacle comprises a plurality of folds of that portion of said peripheral bag wall of flexible sheet material of said second receptacle which when extended upwardly extends beyond said peripheral box side wall of said first receptacle.

5. A disposable litter assembly as set forth in claim 3, wherein said box is made of cardboard.

6. A disposable litter assembly as set forth in claim 3, wherein said bag is made of a synthetic flexible sheet material.

7. A disposable litter assembly as set forth in claim 3, wherein said bag is made of polyethylene.

8. A disposable litter assembly as set forth in claim 3, wherein said box is made of paper material.

9. A disposable litter assembly as set forth in claim 3 in which said box is rectangular in shape, said peripheral box side wall thereof includes a first side wall, a second side wall spaced apart from said first side wall and substantially parallel therewith, a first end wall extending between said first and second side walls at one end thereof and a second end wall extending between said first and second side walls at the opposite end thereof.

10. A disposable litter assembly as set forth in claim 9, wherein said first and second side walls of said box are connected to said first and second end walls at right angle junctions, said right angle junctions being imperforate and unbroken continuations of material forming said side and end walls and said right angle junctions.

11. A disposable litter assembly as set forth in claim 10, wherein said first and second side walls of said box are integrally formed with said first and second end walls to thereby provide said imperforate and unbroken continuations of material forming said side and end walls and said right angle junctions.

12. A disposable litter assembly as set forth in claim 1, wherein said releasable retaining means positioned outwardly of said cavity and of said first receptacle includes an encompassing band extending around the outer periphery of said doubled back upper peripheral portion to hold it against said lower peripheral portion of said peripheral wall of said second receptacle which in turn is adjacent and facing said peripheral wall of said first receptacle.

13. A disposable litter assembly as set forth in claim 12, wherein said band is an elongated strip of flexible material having a first free end and an opposite second free end, including fastening means to releasably fasten said first free end of said elongated strip to said second free end thereof.

14. A disposable litter assembly as set forth in claim 13, wherein said fastening means includes a plurality of tiny flexible hooks on a portion of the inwardly facing surface of said elongated strip extending inwardly from one of said first and second free ends thereof, and a plurality of tiny flexible loops on a portion of the outwardly facing surface of said elongated strip extending inwardly from the other of said first and second free ends thereof, said portion of said elongated strip having said tiny flexible hooks on its inwardly facing surface overlapping said portion having said tiny flexible loops when in place around said doubled back upper peripheral portion of said peripheral wall of said second receptacle.

15. A disposable litter assembly as set forth in claim 13, wherein said fastening means includes a plurality of tiny flexible loops on a portion of the inwardly facing surface of said elongated strip extending inwardly from one of said first and second free ends thereof, and a plurality of tiny flexible hooks on a portion of the outwardly facing surface of said elongated strip extending inwardly from the other of said first and second free ends thereof, said portion of said elongated strip having said tiny flexible loops on its inwardly facing surface overlapping said portion having said tiny flexible hooks when in place around said doubled back upper peripheral portion of said peripheral wall of said second receptacle.

16. A disposable litter assembly as set forth in claim 12, wherein said encompassing band includes a wide strip of wrapping material providing a panel for printed matter to be placed thereon.

17. A disposable litter assembly as set forth in claim 12, wherein said releasable retaining means includes a second encompassing band extending around the outer periphery of said doubled back upper peripheral portion to hold it against said lower peripheral portion of said peripheral wall of said second receptacle which in turn is adjacent and facing said peripheral wall of said first receptacle, said second encompassing band being spaced apart from said first mentioned encompassing band.

18. A disposable litter assembly as set forth in claim 1, including a quantity of litter in said cavity of said first receptacle, and removable cover means on said first receptacle to cover said cavity and said litter therein until ready for use.

19. A disposable litter assembly as set forth in claim 18, wherein said removable cover means includes a clear sheet of flexible sheet material adhered to said peripheral wall of said first receptacle and being removable therefrom to uncover said litter in said cavity of said first receptacle for use.

20. A disposable litter assembly as set forth in claim 1, wherein said hold together means includes an adhesive material adhering a portion of said peripheral wall of said first receptacle to a portion of said peripheral wall of said second receptacle.

* * * * *